(12) United States Patent
Spear et al.

(10) Patent No.: US 7,734,883 B2
(45) Date of Patent: *Jun. 8, 2010

(54) METHOD, SYSTEM AND PROGRAM FOR FORMING A CONSISTENCY GROUP

(75) Inventors: Gail Andrea Spear, Tucson, AZ (US); Robert Francis Bartfai, Tucson, AZ (US); Edward Hsiu-Wei Lin, Tucson, AZ (US); William Frank Micka, Tucson, AZ (US); Olympia Gluck, Haifa (IL); Aviad Zlotnick, Mitzpeh Netofah (IL); Michael E. Factor, Haifa (IL); Thomas Charles Jarvis, Tucson, AZ (US); Sam Clark Werner, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 667 days.

This patent is subject to a terminal disclaimer.

(21) Appl. No.: 11/470,612

(22) Filed: Sep. 6, 2006

(65) Prior Publication Data

US 2007/0028065 A1 Feb. 1, 2007

Related U.S. Application Data

(63) Continuation of application No. 10/676,852, filed on Sep. 29, 2003, now Pat. No. 7,133,986.

(51) Int. Cl.
*G06F 12/12* (2006.01)
(52) U.S. Cl. ............... 711/162; 711/161; 711/E12.069
(58) Field of Classification Search ............. None
See application file for complete search history.

(56) References Cited

U.S. PATENT DOCUMENTS 5,504,861 A 4/1996 Crockett et al.

(Continued)

FOREIGN PATENT DOCUMENTS

EP 0674263 B1 3/1995

(Continued)

OTHER PUBLICATIONS

A.Z. Spector et al., "Performing Remote Operations Efficiently on a Local Computer Network", ACM, 1982, pp. 246-260.

(Continued)

*Primary Examiner*—Reginald G Bragdon
*Assistant Examiner*—Thanh D Vo
(74) *Attorney, Agent, or Firm*—David W. Victor; Konrad Raynes & Victor LLP

(57) ABSTRACT

Provided are a method, system, and program for forming a consistency group of data. Information is provided on a consistency group relationship indicating a plurality of slave controllers and, for each indicated slave controller, a slave storage unit managed by the slave controller. A command is transmitted to each slave controller in the consistency group relationship to cause each slave controller to transmit data in the slave storage unit to a remote storage in a manner that forms the consistency group. A determination is made as to whether all the slave controllers successfully transmitted the data in the slave storage units that is part of the consistency group to the remote storage.

36 Claims, 8 Drawing Sheets

U.S. PATENT DOCUMENTS

| | | | |
|---|---|---|---|
| 5,577,222 A | | 11/1996 | Micka et al. |
| 5,592,618 A | * | 1/1997 | Micka et al. .................. 714/54 |
| 5,615,329 A | | 3/1997 | Kern et al. |
| 5,657,440 A | | 8/1997 | Micka et al. |
| 5,720,029 A | | 2/1998 | Kern et al. |
| 5,734,818 A | | 3/1998 | Kern et al. |
| 6,105,078 A | | 8/2000 | Crockett et al. |
| 6,148,383 A | | 11/2000 | Micka et al. |
| 6,157,991 A | | 12/2000 | Arnon |
| 6,446,176 B1 | | 9/2002 | West et al. |
| 6,493,796 B1 | | 12/2002 | Arnon et al. |
| 6,502,205 B1 | | 12/2002 | Yanai et al. |
| 6,718,352 B1 | | 4/2004 | Dang et al. |
| 6,836,844 B1 | | 12/2004 | Kori et al. |
| 6,907,505 B2 | | 6/2005 | Cochran et al. |
| 6,957,221 B1 | | 10/2005 | Hart et al. |
| 7,133,983 B2 | | 11/2006 | Bartfai et al. |
| 2002/0194015 A1 | | 12/2002 | Gordon et al. |
| 2003/0050930 A1 | | 3/2003 | Mosher et al. |
| 2004/0148376 A1 | | 7/2004 | Rangan et al. |
| 2005/0071372 A1 | | 3/2005 | Bartfai et al. |

FOREIGN PATENT DOCUMENTS

| | | | |
|---|---|---|---|
| EP | 1150210 A2 | | 10/2001 |
| EP | 1217523 A1 | | 6/2002 |
| JP | 2001209565 A | | 8/2001 |
| JP | 2002334002 A | | 11/2002 |
| WO | 0116748 A | | 3/2001 |
| WO | 03028321 A1 | | 4/2003 |

OTHER PUBLICATIONS

IBM Corp., "Integration of Persistent Memory Data into Real-Time Asynchronous Direct Access Storage Device Remote Copy", Technical Disclosure Bulletin, vol. 39, No. 10, Oct. 1996, pp. 187-189.

IBM Corp., "Automatic TV Picture Pop-Up Based on Closed Caption Keyword Match", Research Disclosure document 455173, Mar. 2002, pp. 532.

A. Bhide, "Experiences with Two High Availability Designs", IEEE, Second Workshop on the Management of Replicated Data (Cat. No. 92th0489-5), Nov. 1992, abstract.

J.M. Helary, "Computing Global Functions in Asynchronous Distributed Systems Prone to Crashes", Proceedings 20th IEEE International Conference on Distributed Computing Systems, 2000, abstract.

G. Castets, et al., "IBM TotalStorage Enterprise Storage Server PPRC Extended Distance", IBM Corp., International Technical Support Organization, Document No. SG24-6568-00, Jun. 2002.

PCT Search Report, PCT/EP2004/051850, Filed Aug. 19, 2004.

PCT Written Opinion, PCT/EP2004/051850, filed Aug. 19, 2004.

Reply to Written Opinion dated Jul. 28, 2005 for PCT/EP2004/051850, filed Aug. 19, 2004.

* cited by examiner

Relationship Record

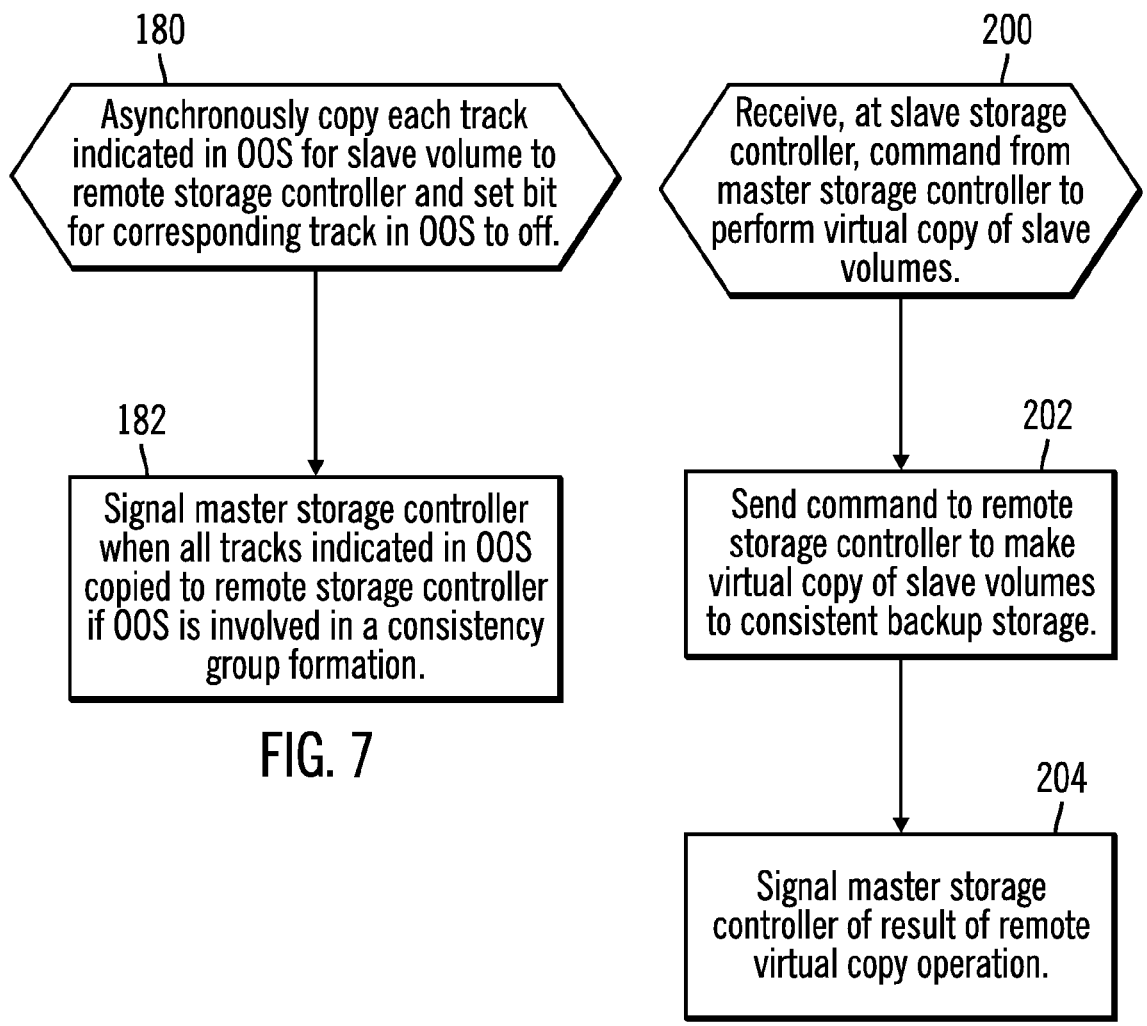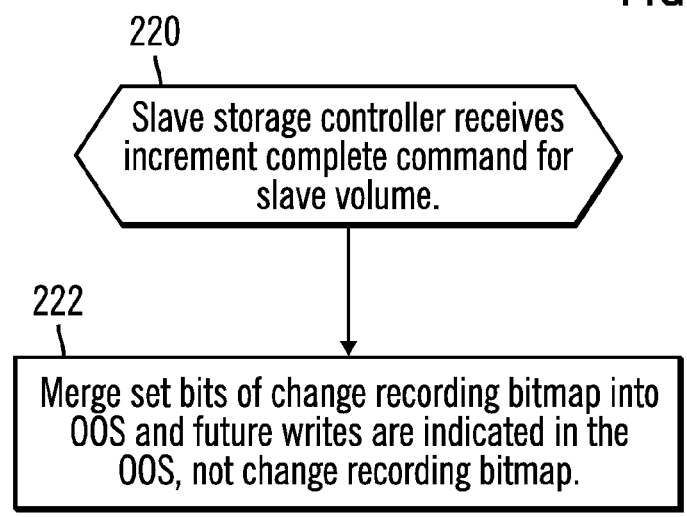

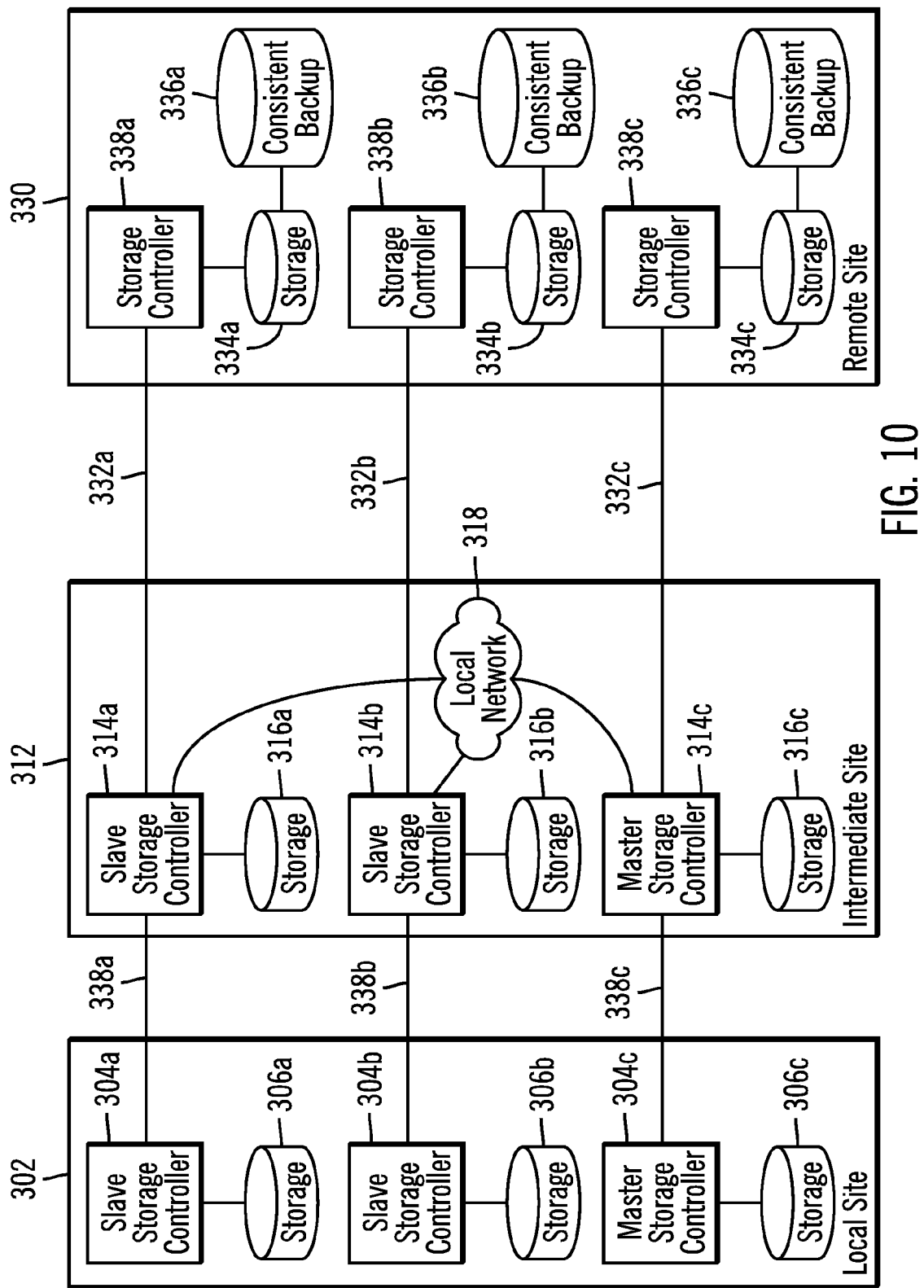

METHOD, SYSTEM AND PROGRAM FOR FORMING A CONSISTENCY GROUP

CROSS-REFERENCE TO RELATED APPLICATIONS

This application is a continuation of U.S. patent application Ser. No. 10/676,852, filed on Sep. 29, 2003, which application is incorporated herein by reference in its entirety.

BACKGROUND OF THE INVENTION

1. Field of the Invention

The present invention relates to a system, method, and program for copying data.

2. Description of the Related Art

Disaster recovery systems typically address two types of failures, a sudden catastrophic failure at a single point in time or data loss over a period of time. To assist in recovery of data updates, a copy of data may be provided at a remote location. Such dual or shadow copies are typically made as the application system is writing new data to a primary storage device. International Business Machines Corporation (IBM), the assignee of the subject patent application, provides the following systems for maintaining remote copies of data at a secondary site, Extended Remote Copy (XRC) and Peer-to-Peer Remote Copy (PPRC). These systems provide a method for the continuous mirroring of data to a remote site to failover to during a failure at the primary site from which the data is being continuously mirrored. Such data mirroring systems can also provide an additional remote copy for non-recovery purposes, such as local access at a remote site. The IBM XRC and PPRC systems are described in the IBM publication "Remote Copy: Administrator's Guide and Reference," IBM document no. SC35-0169-02 (IBM Copyright 1994, 1996), which publication is incorporated herein by reference in its entirety.

In such backup systems, data is maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD. In the IBM XRC environment, the application system writing data to the primary volumes includes a sysplex timer which provides a time-of-day (TOD) value as a time stamp to data writes. The host system time stamps data sets when writing such data sets to volumes in the primary DASD. The integrity of data updates is related to insuring that updates are done at the secondary volumes in the volume pair in the same order as they were done on the primary volume. In XRC and other prior art systems, the cross systems common time stamp provided by the system on behalf of the application program determines and maintains the logical sequence of data updates across any number of data volumes on any number of storage systems. In many application programs, such as database systems, certain writes cannot occur unless a previous write occurred; otherwise the data integrity would be jeopardized. Such a data write whose integrity is dependent on the occurrence of a previous data writes is known as a dependent write. For instance, if a customer opens an account, deposits $400, and then withdraws $300, the withdrawal update to the system is dependent on the occurrence of the other writes, the opening of the account and the deposit. When such dependent transactions are copied from the primary volumes to secondary volumes, the transaction order must be maintained to maintain the integrity of the dependent write operation.

Volumes in the primary and secondary DASDs are consistent when all writes have been transferred in their logical order, i.e., all dependent writes transferred first before the writes dependent thereon. In the banking example, this means that the deposit is written to the secondary volume before the withdrawal. A consistency group is a collection of updates to the primary volumes such that dependent writes are secured in a consistent manner. For instance, in the banking example, this means that the withdrawal transaction is in the same consistency group as the deposit or in a later group; the withdrawal cannot be in an earlier consistency group. Consistency groups maintain data consistency across volumes and storage devices. For instance, if a failure occurs, the deposit will be written to the secondary volume before the withdrawal. Thus, when data is recovered from the secondary volumes, the recovered data will be consistent.

A consistency time is a time the system derives from the application system's time stamp to the data set. A consistency group has a consistency time for all data writes in a consistency group having a time stamp equal or earlier than the consistency time stamp. In the IBM XRC environment, the consistency time is the latest time to which the system guarantees that updates to the secondary volumes are consistent. As long as the application program is writing data to the primary volume, the consistency time increases. However, if update activity ceases, then the consistency time does not change as there are no data sets with time stamps to provide a time reference for further consistency groups. If all the records in the consistency group are written to secondary volumes, then the reported consistency time reflects the latest time stamp of all records in the consistency group. Methods for maintaining the sequential consistency of data writes and forming consistency groups to maintain sequential consistency in the transfer of data between a primary DASD and secondary DASD are described in U.S. Pat. Nos. 5,615,329 and 5,504,861, which are assigned to IBM, the assignee of the subject patent application, and which are incorporated herein by reference in their entirety.

One technique to maintain consistency across copies is to timestamp data across primary volumes using a common clock source, referred to as a SYSPLEX timer. Updates will be transferred in groups defined as all updates having a timestamp less than a certain time. When clock synchronization cannot be easily implemented to form consistency groups across systems, then another technique for forming consistency groups is to determine a cut-off time. Any updates to primary volumes managed by the primary controller cache dated as of the that cut-off time are transferred to the secondary controller for storage in the secondary volumes. While transferring the data in the consistency group, the primary storage controller would return busy to any host requests while the data in the consistency group is transferred. After the data in the consistency group is transferred and the primary and secondary storage controller are synchronized, i.e., any updates whose timestamp is less than the cut-off time, then the primary controller would cease returning busy to the applications. This ensures that the primary and secondary volumes are consistent as of the freeze cut-off time.

SUMMARY OF THE PREFERRED EMBODIMENTS

Provided are a method, system, and program for forming a consistency group of data. Information is provided on a consistency group relationship indicating a plurality of slave controllers and, for each indicated slave controller, a slave storage unit managed by the slave controller. A command is transmitted to each slave controller in the consistency group relationship to cause each slave controller to transmit data in the slave storage unit to a remote storage in a manner that forms the consistency group. A determination is made as to whether all the slave controllers successfully transmitted the data in the slave storage units that is part of the consistency group to the remote storage.

In further implementations, the remote storage is located at a remote site and each slave storage unit is stored within a storage system attached to one slave controller.

In still further implementations, each slave controller maintains a first data structure indicating updated data in the slave storage unit, wherein the slave controller transmits data in the slave storage unit indicated in the first data structure to the remote storage. Further, a command is transmitted to each slave controller to cause the slave controller to generate a second data structure to indicate any writes received to the slave storage unit during the transmittal of data in the slave storage unit indicated in the first data structure to the remote storage.

In yet further implementations, a command is transmitted to each slave controller to cause each slave controller to initiate an operation to cause the data from the slave storage unit at the remote storage to be copied to a remote backup storage after determining that all the slave controllers have successfully transmitted the data in the slave storage units to the remote storage.

Further provided are a method, system, and program for forming a consistency group. A command is received from a master controller to generate a first data structure to indicate updates to a slave storage unit to form a consistency group initiated by the master controller and the first data structure is generated. A complete is transmitted to the master controller after generating the first data structure and the updated data in the slave storage unit indicated in a second data structure is copied to the remote storage, wherein the data is copied to form the consistency group. Complete is transmitted to the master controller after successfully copying the data in the slave storage unit to the remote storage.

In further implementations, indication is made in the second data structure that data in the slave storage unit is not updated in response to transmitting the corresponding data to the remote storage. Indication is also made in the second data structure of updated data in the slave storage unit that is indicated as updated in the first data structure in response to the second data structure not indicating any updated data to copy to the remote storage. Further, indication is made of updates to data in the slave storage unit in the second data structure that are received after completing the copying of the data to the remote storage.

BRIEF DESCRIPTION OF THE DRAWINGS

Referring now to the drawings in which like reference numbers represent corresponding parts throughout:

FIGS. 5-9 illustrates operations performed by storage controllers to copy data to a remote site in accordance with implementations of the invention;

FIG. 10 illustrates an additional network computing environment in which aspects of the invention are implemented.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
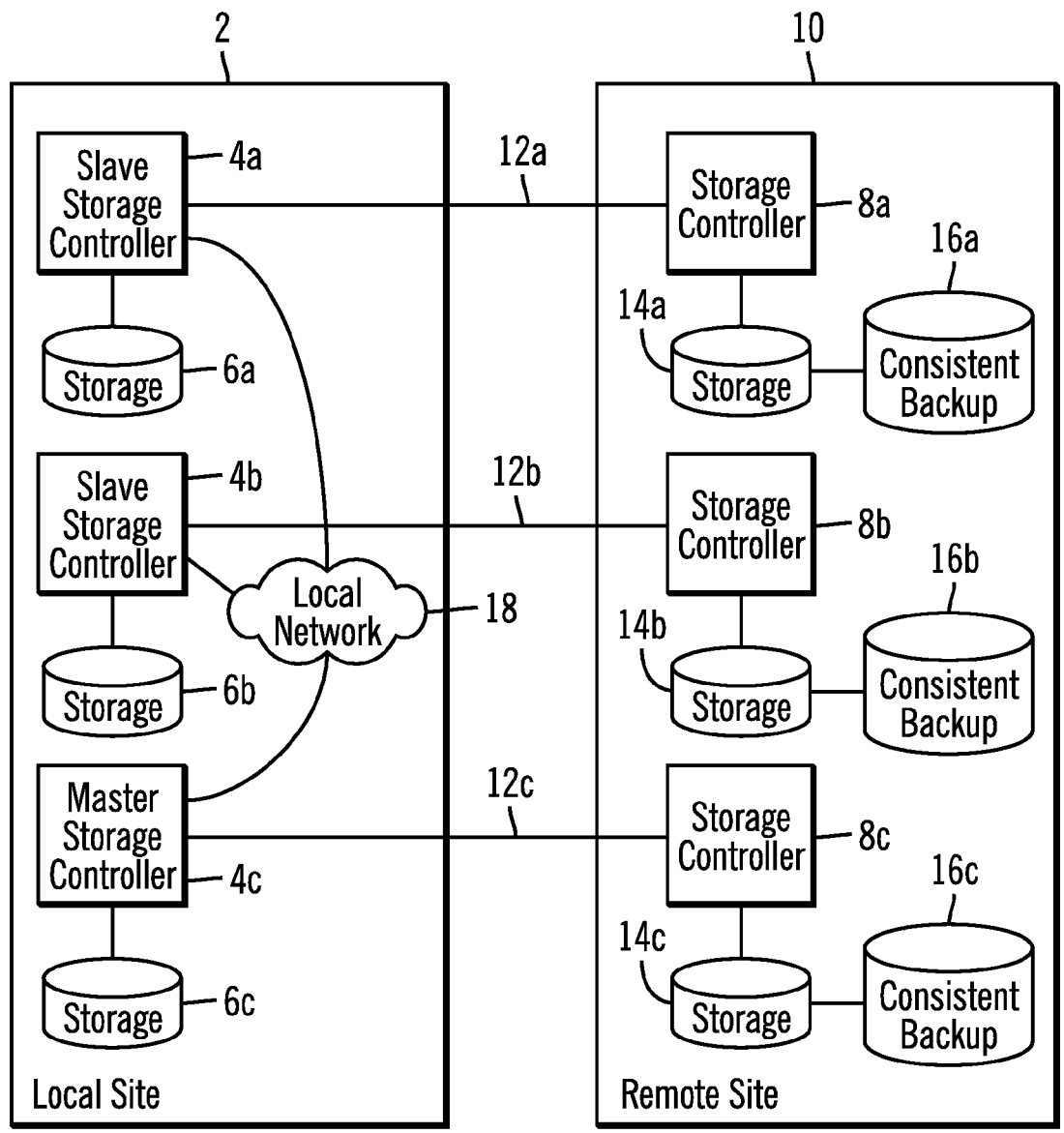
FIG. 1 is a block diagram illustrating a network computing environment in which aspects of the invention are implemented.

FIG. 1 illustrates a network computing environment in which aspects of the invention may be implemented. A local site 2 includes storage controllers 4a, 4b, 4c, where each storage controller 4a, 4b, 4c is coupled to an attached storage system 6a, 6b, 6c, respectively. The storage controllers 4a, 4b, and 4c manage Input/Output (I/O) access to volumes in the storage systems 6a, 6b, 6c from host systems (not shown). Each storage controller 4a, 4b, 4c copies data to a corresponding remote storage controller 8a, 8b, 8c at a remote site 10 via connections 12a, 12b, and 12c. The storage controllers 4a, 4b, and 4c transmit data consistent as of point-in-times to the remote storage controllers 8a, 8b, 8c, where the remote storage controllers 8a, 8b, 8c store the data to their respective attached remote storage systems 14a, 14b, 14c. In certain implementations, the storage controllers 4a, 4b, 4c continuously transmit data to the remote site 10, and at certain instances in time will ensure consistency of the data at the remote site 10. In certain implementations, the remote site 10 may save a consistency group of data to another storage, such as consistent backup storages 16a, 16b, 16c, to maintain a backup of the consistent data at the remote site 10. After a consistent group of data is transmitted to the remote storage 14a, 14b, 14c, a copy is made from remote storage 14a, 14b, 14c to a respective consistent backup storage 16a, 16b, 16c. Although FIG. 1 illustrates a certain number of components at the sites, such as three storage controllers and storages, the described implementations may operate with any number of storage controllers and storage systems at the sites.

The remote site 10 may be hundreds or thousands of miles from the local site 2. The connections 12a, 12b, 12c between pairs of storage controllers may comprise a dedicated line, such as a dedicated fibre optical network or connection maintained by a long distance telecommunication carrier, long distance fibre optic connection having channel extenders, or extend through a network, such as a Storage Area Network (SAN), Local Area Network (LAN), the Internet, and Intranet, etc.

Host systems (not shown) at the local site 2 may perform Input/Output (I/O) operations with respect to volumes in the storage systems 6a, 6b, and 6c. The host systems may communicate with storage controllers 4a, 4b, 6c via any network or connection known in the art. The storage controllers 4a, 4b, 4c at the local site may have certain master-slave relationships with respect to the volumes managed by the storage controllers. For instance, one storage controller may be designated as a master, e.g., 4c, and others designated as slaves, e.g., 4a, 4b, where certain volumes managed by the designated slaves are managed by the storage controller designated as the master. In this way, one master storage controller may manage remote copy operations for specified volumes for slave controllers designated as slaves for a particular master.

The storage controllers 4a, 4b, 4c, 8a, 8b, 8c further include a processor complex and may comprise any storage controller or server known in the art, such as the IBM Enterprise Storage Server (ESS)®, 3990 Storage Controller, etc. (Enterprise Storage Server is a registered trademark of IBM). The storage systems 6a, 6b, 6c, 14a, 14b, 14c, 16a, 16c, and 16c may comprise an array of storage devices, such as Just a Bunch of Disks (JBOD), Redundant Array of Independent Disks (RAID) array, virtualization device, etc.

Figure 2:
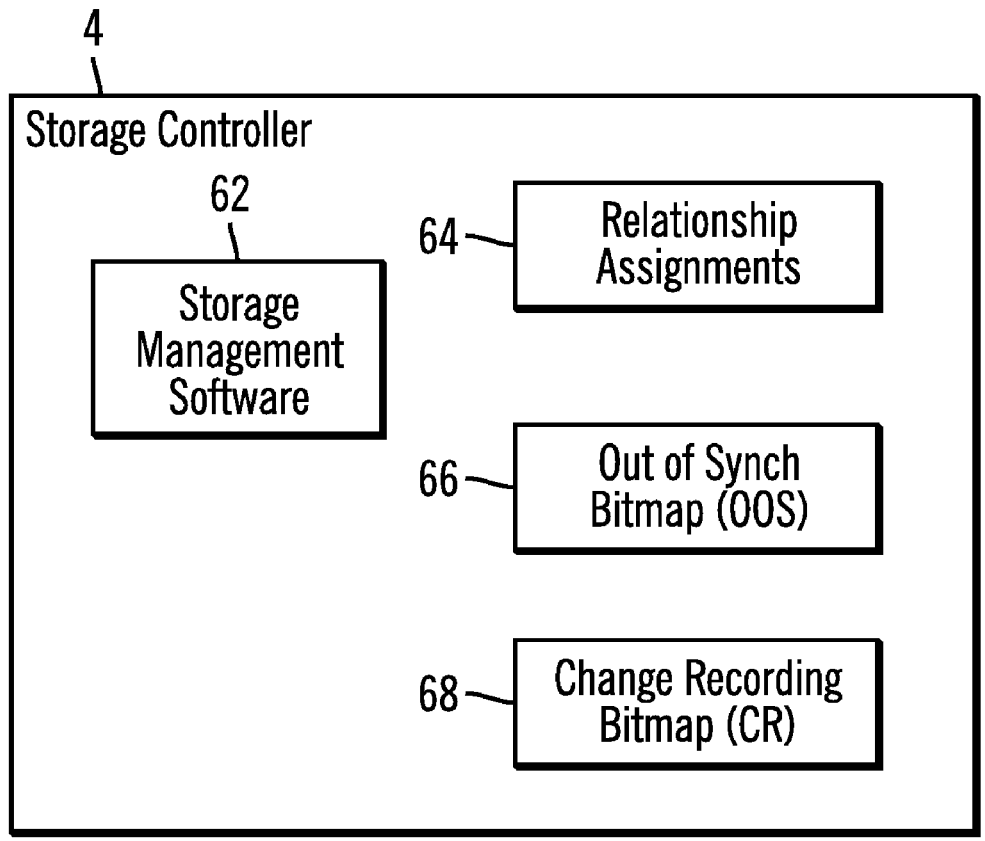
FIG. 2 illustrates an arrangement of a storage controller in accordance with implementations of the invention.

FIG. 2 illustrates programs and information that may be included in a storage controller 4 at the local site 2, e.g., storage controllers 4a, 4b, 4c, including storage management software 62, relationship assignment information 64, an out-of-synch bitmap (OOS) 66, and a change recording (CR) bitmap 68. The storage management software 62 may include code to allow for remote copying of data, such as the code included in the IBM PPRC Extended Distance program, to allow for mirroring of data over relatively short and long distances. Further details of the IBM PPRC extended distance program are described in the IBM publication "IBM Total-Storage Enterprise Storage Server PPRC Extended Distance", having document no. SG24-6568-00 (Copyright IBM, June 2002), which publication is incorporated herein by reference in its entirety. The relationship information 64 maintained by the storage management software 62 includes information for each volume (or portion of a volume) on the storage 6a, 6b, 6c, respectively, subject to a consistency group relationship. For master-slave environments, such as shown in FIG. 1, the relationship information 64 further indicates whether the storage controller is a master for a consistency group relationship or whether a volume in the attached storage is a slave in a consistency group relationship. A storage controller designated as the master storage controller, e.g., 4c, manages consistency group copy operations for designated volumes in its attached storage, e.g., 6c, or volumes in other storage systems, e.g., 6a, 6b, managed by other storage controllers, e.g., 4a, 4b, designated as slaves. Thus, the master-slave designation may be made on a volume-by-volume basis. In alternative implementations, the master-slave designation may be made at a sub-volume level. Different volumes in one storage controller may be assigned as slaves to different point-in-time copy relationships. Thus, a master storage controller may control the point-in-time copy for volumes distributed in the storage systems managed by different storage controllers.

The local storage controllers 4a, 4b, 4c may communicate over a local network 18, which may comprise direct connections or a switched network. Alternatively, the storage controllers 4a, 4b, 4c may communicate over a link 12a, b, c if the links also extend through a network at the local site 2.

In further implementations, the mirroring of data and consistency group management may occur on a session basis. A session may be defined as including multiple volumes that may be referenced using a session name when the session is started. A master-slave relationship may be assigned to a session so that relationship would apply to all volumes in the session. All volumes defined within a session would be included in the same consistency group.

Figure 3:
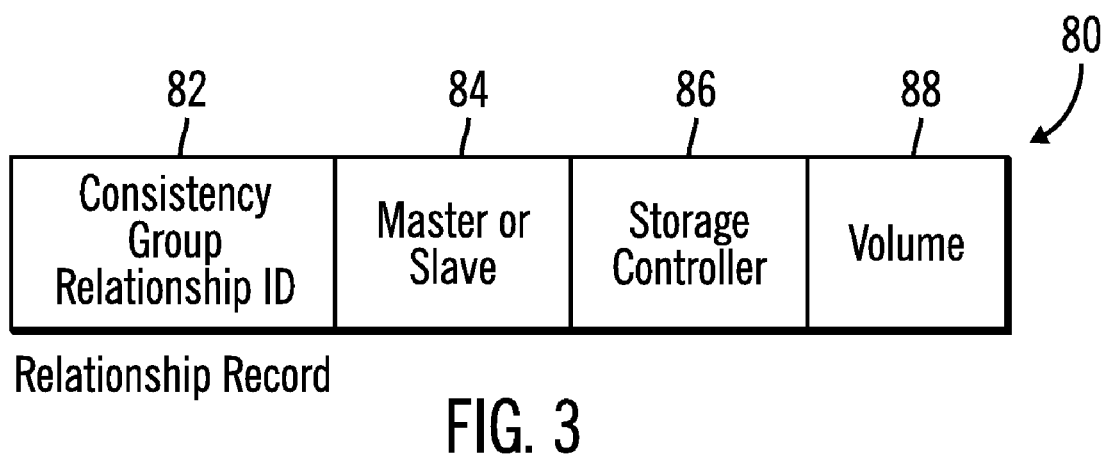
FIG. 3 illustrates relationship information in accordance with implementations of the invention.

The relationship information 64 may include a plurality of relationship assignments, one for each volume for which the storage controller is designated as a master or slave. FIG. 3 illustrates information included in a relationship assignment 80. A relationship identification field 82 indicates an ID of a consistency group copy relationship because there may be many relationships, each assigned a group of volumes, across the storage controllers 4a, 4b, 4c. Thus, a storage controller 4a, 4b, 4c may be a master for multiple consistency group relationships, or have volumes that are slaves in different relationships. The master-slave field 84 indicates whether the assignment is for a master or slave relationship. If the master-slave indicator 84 specifies "master", then that storage controller, e.g., 4c, including that assignment 80, is a master in the master-slave relationship identified in field 84 for the volume indicated in the volume information 88 managed by the storage controller, e.g., 4a or 4b, indicated in the storage controller information 86. Likewise, if the master-slave indicator 82 specifies "slave", then the volume in the attached storage, e.g., 6a or 6b, indicated in the volume information 88, is a slave in the relationship identified in field 84 to the master storage controller, e.g., 4c, indicated in the storage controller information 86. A master storage controller, e.g., 4c, may be assigned a slave volume that is in storage, e.g., 6a, 6b, attached to another storage controller, e.g., 4a, 4b, or is in the storage, e.g., 6c, attached to the master storage controller, e.g., 4c. Thus, a master may be assigned slave volumes in the attached storage and/or in storage systems attached to other storage controllers. Further, a storage controller may be assigned as a master for volumes in the attached storage and/or storages managed by other storage controllers and, at the same time, include volumes that are assigned as slaves to a master, where that master may be the storage controller itself or another storage controller.

Further, the assignment information 64 for a master storage controller would include a relationship record 80 for each slave volume on a slave storage controller, where the slave storage controller and volume would be indicated in fields 86 and 88, respectively. The relationship information may be maintained in a different arrangement and format than shown in FIG. 3, and may be maintained in any data structure known in the art, such as a text or formatted text file, database, etc.

An out-of-synch bitmap 66 includes a bit for each track that the slave storage controllers are to copy over to the corresponding remote storage. During normal copy operations, any writes to a storage controller are recorded in the out-of-synch bitmap (OOS) 66 and then copied over to the remote storage. The change recording bitmap 68 includes a bit for each track to which an update is received during the formation of a consistent set of data, where the formation occurs by the master storage controller, e.g., 4c, managing the slaves, e.g., 4a, 4b, to all copy all the data in their out-of-synch bitmaps 66 as of a point in time. Further, the storage controllers 4a, 4b, 4c may maintain one set of these bitmaps for each volume, or alternatively maintain one set of bitmaps 66 and 68 for a group of volumes in the attached storage 6a, 6b, 6c.

Figure 4:
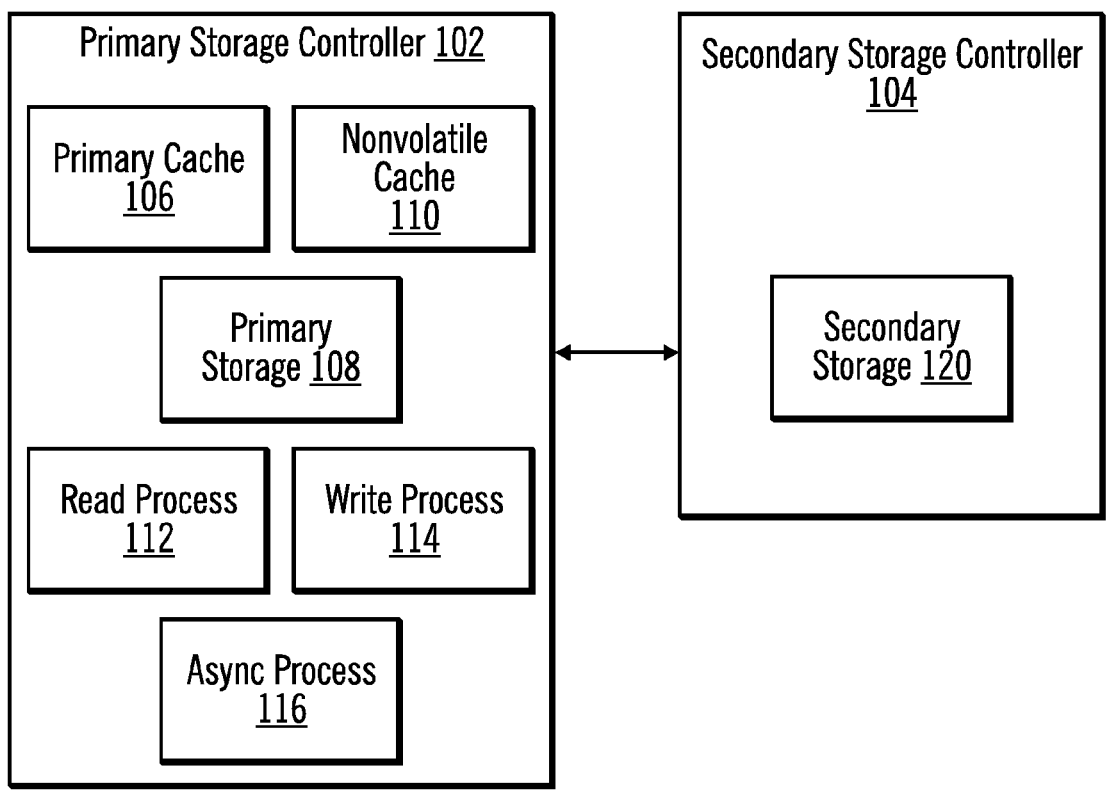
FIG. 4 illustrates components within the storage controllers of FIG. 1 in which aspects of the invention are implemented.

In certain implementations, the storage controllers always run a background process to copy any tracks indicates as updated in their out-of-synch bitmaps to the remote storage. This process continues in the slave controllers even after the formation of a consistency group is initiated and the change recording bitmap created. FIG. 4 illustrates further details of the storage controllers 4a, 4b, 4c, where each is referred to a primary storage controller 102 that copies data to a secondary storage controller 104, such as storage controllers 14a, 14b, 14c, which receive the data. The primary storage controller 102 includes a primary cache 106 in which updates to tracks in the attached storage 108 managed by the primary storage controller 102, such as storages 6a, 6b, 6c, are maintained until written to the attached primary storage 108 (i.e., the tracks are destaged). Additionally, the primary storage controller 102 includes a nonvolatile cache 110. The non-volatile cache 110 may be, for example, a battery-backed up volatile memory, to maintain a non-volatile copy of data updates and other information.

The primary storage controller 102 includes a read process 112 for reading data, and a write process 114 for writing data. The primary storage controller 102 also includes an async process 116 for transferring data from the primary storage controller 102 to remote storage, such as storage at the secondary storage controller 104. In certain implementations, the async process 116 may perform synchronization of data for an asynchronous PPRC Extended Distance service. In such cases, the async process 116 runs continuously for the PPRC Extended Distance service. In certain implementations, there may be multiple async processes (e.g., one async process for each volume on primary storage 108 for PPRC Extended Distance). In certain implementations, the read process 112, write process 114, and async process 116 are implemented as firmware. The secondary storage controller 104 writes the data received from the primary storage controller 102 to secondary storage 120, such as storages 14a, 14b, 14c (FIG. 1). The different processes 112, 114, and 116 may be implemented in storage management software 62.

Figure 5:
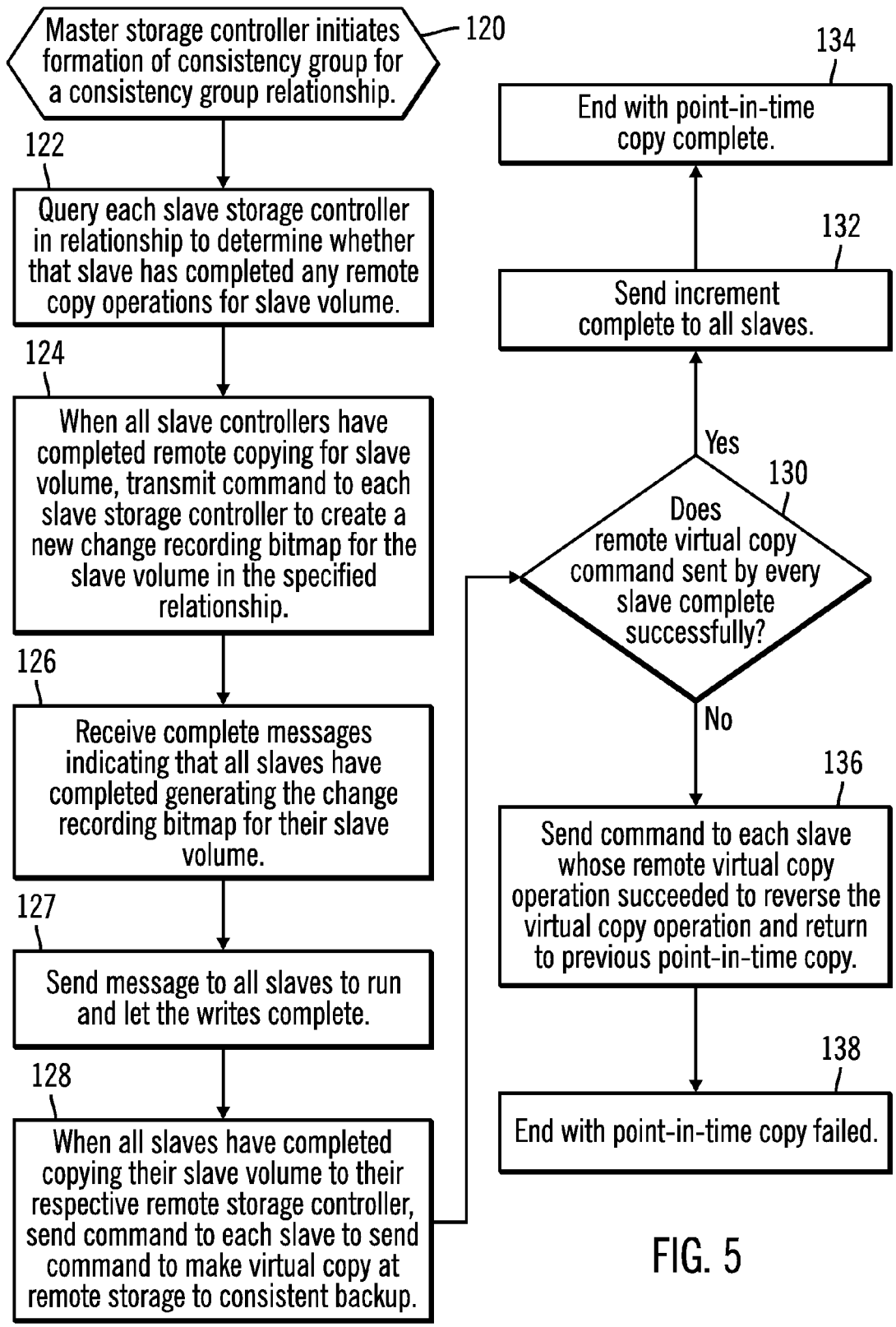

FIG. 5 illustrates operations performed by a master storage controller, e.g., 4c, to manage a point-in-time copy operation. A master storage controller may implement a policy that indicates when the master will initiate the formation of a consistency group to copy the volumes subject to the consistency group relationship. Additionally, the master may initiate consistency group formation operations in response to an administrator command. Upon the master storage controller initiating (at block 120) the formation of a consistency group with respect to a specified consistency group relationship, the master storage controller, e.g., 4c, queries (at block 122) each slave storage controller, e.g., 4a, 4b, in the specified relationship to determine whether that slave has completed any remote copy operations for the slave volume subject to the relationship. As discussed, the master storage controller, e.g., 4c, for the specified relationship would include a relationship record 80 (FIG. 3) for each slave volume in the specified relationship identifying the slave storage controller in field 86 and slave volume 88, where the slave storage controller may be the master or a different storage controller. Upon determining (at block 124) that all slave controllers have completed remote copying for their respective slave volumes, then a command is transmitted to each slave storage controller, e.g., 4a, 4b, to create a new change recording bitmap 68 for the slave volume in the specified relationship. The master storage controller may learn that the slaves have completed all remote copying by querying the slaves or by the slaves notifying the master when remote copying is complete. In alternative implementations, the step of block 122 may not be performed and, instead, control would proceed to block 124 to transmit the command to each slave storage controller to create a new change recording bitmap.

Figure 6:
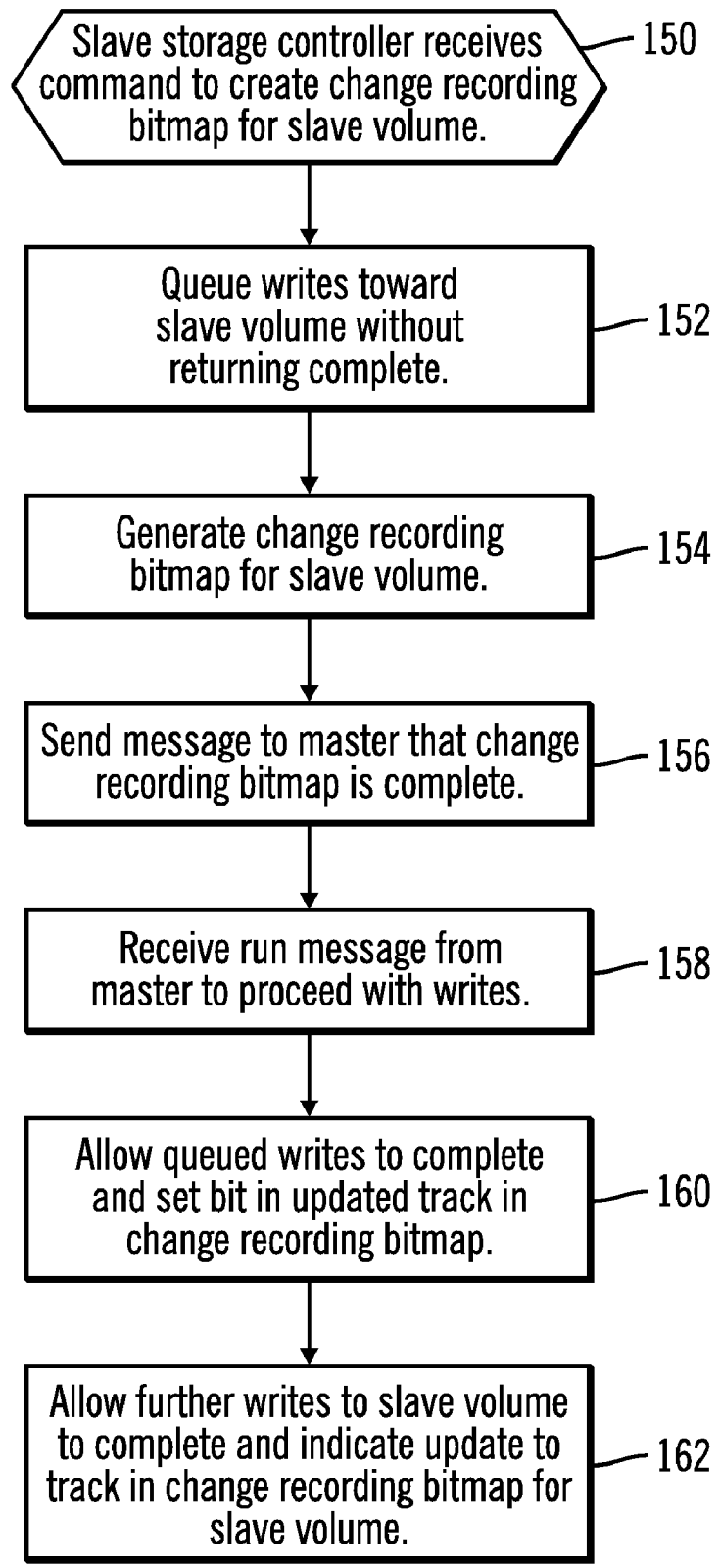

FIG. 6 illustrates operations the slave storage controllers, e.g., 4a, 4b, perform in response to receiving the command to generate the change recording bitmap for the slave volume. Upon receiving (at block 150) the command to generate the change recording bitmap 68 for the slave volume, the slave storage controller, e.g., 4a, 4b, queues (at block 152) any subsequent writes directed to the slave volume without returning complete. The change recording bitmap 68 for the slave volume is generated (at block 154) and a message is sent (at block 156) to the master indicating the initialization of the change recording bitmap 68. Upon receiving (at block 158) a message or command from the master storage controller, e.g., 4c, to proceed with writes, queued writes to the slave volume are allowed to complete (at block 160) and the bit for the updated track in the change recording bitmap 68 is set to indicate the update. Alternatively, indication of the queued writes may be made to the out-of-synch bitmap 66 instead of the change recording bitmap 68. In this way, the formation of the consistency group only delays host writes for a short period of time while the change recording bitmap 68 is generated, where such delay during which host writes are queued may not even be noticeable or may appear to the host as a slightly longer write. The slave storage controller, e.g., 4a, 4b, then completes any subsequent writes to the slave volume (at block 162) and indicates the update to the track in the change recording bitmap 68 for the slave volume in storage, e.g., 4a, b.

With respect to FIG. 5, the master storage controller, e.g., 4c, receives (at block 126) complete messages from all the slave storage controllers, e.g., 4a, 4b, indicating that they have completed generating the change recording bitmap 68 for their slave volumes and then sends (at block 127) a run message to the slave storage controllers to signal them to proceed with their writes.

FIG. 7 illustrates operations the slave storage controllers, e.g., 4a, 4b, perform when copying the tracks out-of-synch bitmap (OOS) 66, which occurs as part of an asynchronous background process that continually runs. The slave storage controller asynchronously copies (at block 182) each track indicated in the out-of-synch bitmap (OOS) 66 for the slave volume to the corresponding remote storage controller, e.g., 8a, 8b, and sets the bit for the corresponding track in the OOS 66 to "off" when completing the asynchronous copy. The slave storage controller signals (at block 182) the master storage controller when all tracks indicated in the OOS 66 for the slave volume have been asynchronously copied to the corresponding remote storage controller at the remote site 10 if the OOS 66 was involved in the formation of a consistency group. If the OOS 66 did not represent a volumes included in a consistency group in the process of being formed, then there may be no notification to the master of the completion of the copying of the tracks for that OOS 66.

Further, storage controllers asynchronously copying the data indicated in their out-of-synch (OOS) 66 bitmaps to the remote storage may perform conflict management operations. For instance, if a storage controller 4a, 4b, 4c receives an update to a track whose corresponding bit in the OOS 66 is set to indicate that there already is an update for that track that has not yet been copied over to the remote site, where such older update may or may not be part of a consistency group, then the storage controller 4a, 4b, 4c may take action to avoid overwriting the older update until such update has been copied over. Such conflict management would ensure an older update that is part of a consistency group is copied to the remote site to ensure consistency at the time of formation of the consistency group. In certain implementations, the storage controller receiving the update may queue the update until the older update is copied over to the remote site. Alternatively, the storage controller may return a "fail" to the update while there is a pending update to copy over. Additional details of managing conflicts with updated tracks indicated in the OOS are described in the copending and commonly assigned patent application entitled "Method, System, and Program for Asynchronous Copy", having U.S. application Ser. No. 10/675,317, which patent application is incorporated herein by reference in its entirety and filed on Sep. 29, 2003.

With respect to FIG. 5, when the master storage controller, e.g., 4b, determines (at block 128) that all slave storage controllers, e.g., 4a, 4b, have completed copying their slave volume to their respective remote storage controller, e.g., 8a, 8b, the master storage controller sends a command to each slave controller to cause the slave controller to, in turn, send a command to cause the respective remote storage controller 8a, 8b, to make a copy of the slave volume stored in the remote storage, e.g., 14a, 14b, to the consistent backup storage, e.g., 16a, 16b. In certain implementations, the copy operation from the remote storage 14a, 14b, 14c to the consistent backup 16a, 16b, 16c may comprise a virtual copy operation, such as a FlashCopy® operation. (FlashCopy is a registered trademark of IBM) A FlashCopy® operation involves establishing a logical point-in-time relationship between source and target volumes on the same or different devices and then subsequently copying the data subject to the relationship from the source to target volumes. The FlashCopy® operation guarantees that until a track in a FlashCopy® relationship has been hardened to its location on the target disk, the track resides on the source disk.

FIG. 8 illustrates operations the slave storage controllers perform in response to receiving (at block 200) the command to cause the virtual copy operations between the remote storage, e.g., 14a, 14b, and the consistent backup 16a, 16b. In response to the command, the slave storage controller, e.g., 4a, 4b, sends (at block 202) a command to the corresponding remote storage controller, e.g., 8a, 8b, to cause the remote storage controller make a virtual copy of the slave volume to the corresponding consistent backup storage, e.g., 16a, 16b. The slave storage controller then signals (at block 204) the master storage controller of the result of the remote virtual copy operation.

With respect to FIG. 5, the master storage controller determines (at block 130) whether the remote virtual copy command sent by every slave storage controller has successfully completed. This may be determined by the master querying the slaves or by the slaves notifying the master when learning the result of the remote virtual copy operation. If (at block 130) all virtual copy operations initiated by all slaves have completed successfully, then an "increment complete" message is sent (at block 132) to every slave storage controller to complete the point-in-time copy operation and the point-in-time operation ends with "complete" (at block 134). Otherwise, if the virtual copy operation has not completed successfully for all slaves, then the master storage controller sends (at block 136) a command to each slave storage controller whose remote virtual copy operation succeeded to reverse the virtual copy operation and return to previous point-in-time copy on the consistent backup, e.g., 16a, 16b. Further details of reversing the virtual copy operation are described in the copending and commonly assigned patent application entitled "Autonomic Infrastructure Enablement for Point in Time Copy Consistency Groups", having attorney docket no. TUC920030109US1, which application is incorporated herein by reference in its entirety and filed on the same date hereof.

FIG. 9 illustrates operations the slave storage controller performs in response to receiving (at block 220) the "increment complete" message from the master storage controller. In response, the slave storage controllers merge (at block 222) the set bits of the change recording bitmap 68 for the slave volume, indicating updated tracks, into the drained out-of-synch (OOS) bitmap 66, and subsequent writes to the slave volume are indicated in the OOS 66, not the change recording bitmap 68, which may now be discarded.

With the described implementations, volumes subjected to a consistency group relationship may reside on storage systems managed by different storage controllers. A master storage controller would coordinate the remote copying of data at the different storage controllers when forming the consistency group.

The out-of-synch 66 and change recording 68 bitmaps may be used in alternative remote copy environments. For instance, in a single controller environment, without any master-slave relationships, the storage controller may receive a consistency group formation command to copy specified volumes managed by the storage controller to a remote site. In response, the storage controller would queue any further writes while generating the change recording bitmap 68. After generating the change recording bitmap 68, any queued writes and subsequent writes would be indicated in the change recording bitmap 68, and tracks indicated in the out-of-synch bitmap 66 would be copied to the remote site. After the OOS 66 is drained and the asynchronous remote copy operations completed, new writes may again be recorded in the OOS 66, the change recording bitmap 68 merged with the OOS 66, and then the change recording bitmap 68 discarded. Further, a virtual copy may be performed at the remote site of the volumes consistent as of the time of the storage controller receiving the point-in-time copy command.

FIG. 10 illustrates a four volume solution, where the storage controllers 314a, 314b, 314c at an intermediate site 312 may operate in the same manner as the storage controllers 4a, 4b, and 4c described with respect to FIG. 1 and the components at the remote site 330 may operate as described at the remote site 10 components described with respect to FIG. 1. The local site 302 and intermediate site 312 may be situated in a relatively close geographical area, such as a same building, different buildings in a same campus, a same city, etc. The connections 338a, 338b, 338c between the storage controllers at the local 302 and intermediate 312 sites may comprise separate dedicated lines or the connections may extend through a switched network, such as a Storage Area Network (SAN), Local Area Network (LAN), the Internet, an Intranet, etc. The remote site 330 may be hundreds or thousands of miles from the local 302 and intermediate 312 sites. The connections 332a, 332b, 332c may comprise the connections 12a, 12b, 12c described above with respect to FIG. 1, comprising long distance connections.

In the implementation of FIG. 10, hosts would direct I/O requests to the storage controllers 304a, 304b, 304c managing storage systems 306a, 306b, 306c at the local site 302. The storage controllers 304a, 304b, 304c at the local site 302 would then synchronously copy any writes to the storage controllers 314a, 314b, 314c at the intermediate site 312. In certain implementations, the host writes would not complete until the local storage controllers 304a, 304b, 304c synchronously copied the data to the intermediate site 312. The master storage controllers, e.g., 314c, would then asynchronously manage consistency group formation at the remote site 330 as described with respect to FIGS. 5-9 according to remote copy policies implemented in the master storage controllers at the intermediate site 312.

Additional Implementation Details

The described techniques to form consistency groups may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and nonvolatile memory devices (e.g., EEPROMs, ROMs, PROMs, RAMs, DRAMs, SRAMs, firmware, programmable logic, etc.). Code in the computer readable medium is accessed and executed by a processor complex. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described implementations were described with respect to the IBM Asynchronous Cascading PPRC computing environment. However, the described implementations for maintaining consistency could be applied to maintain consistency in other computing and vendor environments and using other data copying protocols and programs than described herein.

In described implementations, the master and storage controller processes were executed in a distributed computing environment. In alternative implementations one or more of the slave processor operations may be executed in the same machine or platform in which the master storage controller processes are executed.

In certain implementations, data in the storage devices is arranged in volumes. In alternative systems, the storage areas on which data is maintained may be grouped according to storage units other than volumes that are grouped in groupings other than sessions for the purpose of maintaining consistency.

In described implementations, the storage units designated as the slaves in the master-slave copy relationship comprised volumes. In alternative implementations, other storage unit values may be assigned as a slave to a master, where such storage units may comprise tracks in a volume, blocks, logical subsystems, logical drives, or any other physical or logical storage unit designation known in the art.

In described implementations, data updates were organized in consistency groups before being transferred from one storage controller to another. In alternative implementations, the data copied between the different storage controllers may not comprise a consistency group.

The described operations for forming a consistency group may be used in a critical data environment where high availability is paramount. However, those skilled in the art will appreciate that the point-in-time copy operations described herein may apply to storage systems used for non-critical data where high availability is not absolutely necessary.

In the described implementations, each storage controller copies data to a corresponding remote storage controller having an attached remote storage system. In alternative implementations, multiple storage controllers at the local or intermediate site may copy data to one remote storage controller, where a single remote storage controller may receive point-in-time data from multiple local or intermediate storage controllers.

The illustrated logic of FIGS. 5-9 show certain events occurring in a certain order. In alternative implementations, certain operations may be performed in a different order, modified or removed. Morever, steps may be added to the above described logic and still conform to the described implementations. Further, operations described herein may occur sequentially or certain operations may be processed in parallel. Yet further, operations may be performed by a single processing unit or by distributed processing units.

Figure 11:
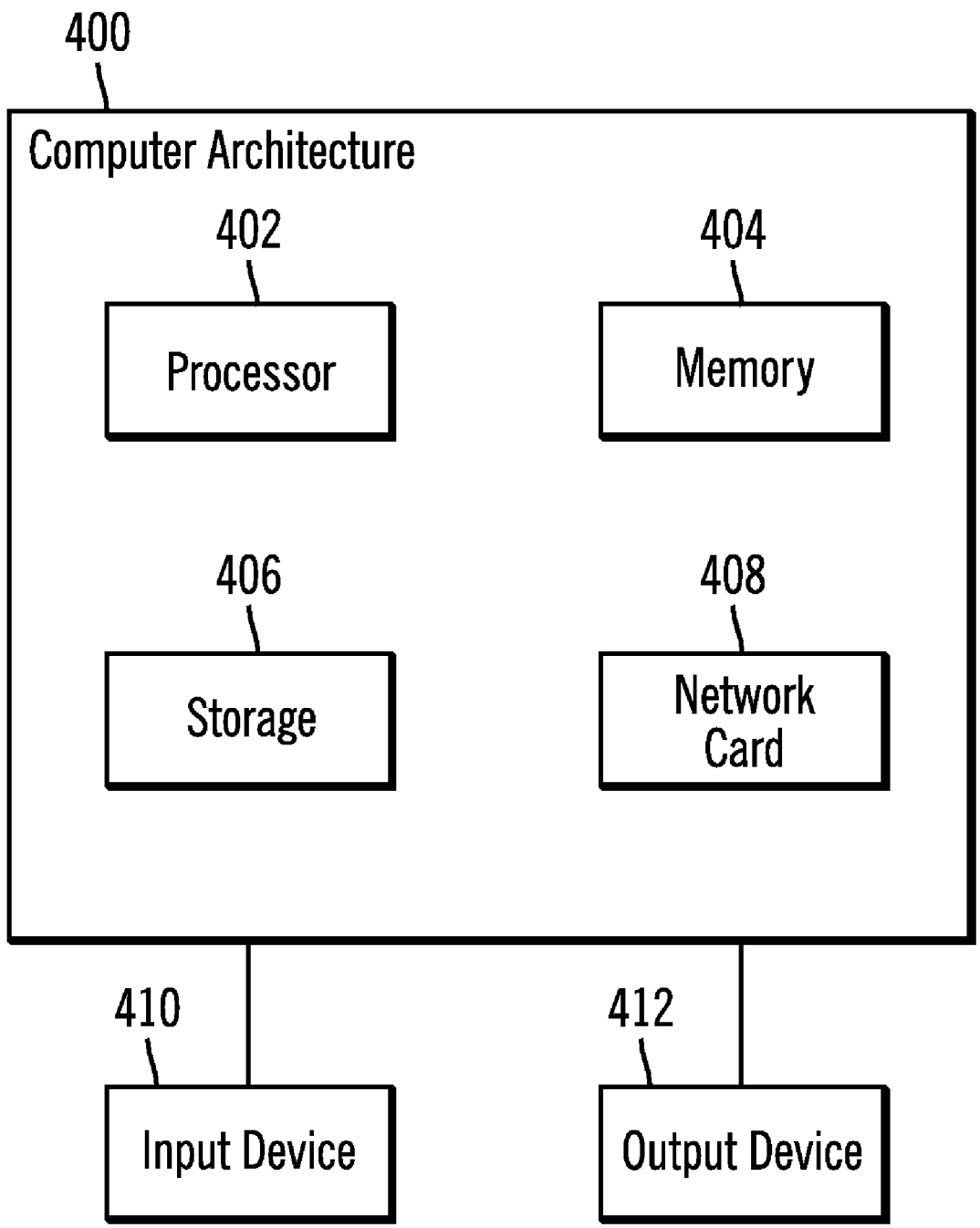
FIG. 11 illustrates an architecture of computing components in the network environments, such as the storage controllers, used with implementations of the invention.

FIG. 11 illustrates one implementation of a computer architecture 400 of the network components, such as the storage controllers shown in FIGS. 1 and 9. The architecture 400 may include a processor 402 (e.g., a microprocessor), a memory 404 (e.g., a volatile memory device), and storage 406 (e.g., a non-volatile storage, such as magnetic disk drives, optical disk drives, a tape drive, etc.). The storage 406 may comprise an internal storage device or an attached or network accessible storage. Programs in the storage 406 are loaded into the memory 404 and executed by the processor 402 in a manner known in the art. The architecture further includes a network card 408 to enable communication with a network. An input device 410 is used to provide user input to the processor 402, and may include a keyboard, mouse, pen-stylus, microphone, touch sensitive display screen, or any other activation or input mechanism known in the art. An output device 412 is capable of rendering information transmitted from the processor 402, or other component, such as a display monitor, printer, storage, etc.

The foregoing description of various implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for forming a consistency group of data, comprising:

providing information on a consistency group relationship indicating a plurality of slave controllers and, for each indicated slave controller, an indicated portion of a slave storage unit managed by the slave controller, wherein the slave controllers indicated in the consistency group transmit data from the indicated portions of their respective slave storage units consistent as of a point-in-time;

transmitting a command to each slave controller in the consistency group relationship to cause each slave controller to transmit data in the portion of the slave storage unit to a remote storage in a manner that forms the consistency group;

determining whether all the slave controllers successfully transmitted the data in the portions of the slave storage units that is part of the consistency group to the remote storage; and copying data from a plurality of local controllers at a local site to the slave controllers at an intermediate site to store in the slave storage units, wherein the local controllers and slave controllers are at different geographical sites and the remote storage is at a remote geographical location with respect to the geographical sites including the local and slave controllers.

2. The method of claim 1, wherein the remote storage is located at a remote site and wherein each slave storage unit is stored within a storage system attached to one slave controller.

3. The method of claim 1, wherein the operations of providing information on the consistency group relationship, transmitting the commands to each slave controller, and determining whether all the slave controller successfully transmitted the data in the slave storage units to form the consistency group are performed by a master controller in data communication with the slave controllers.

4. The method of claim 3, wherein the master controller also comprises one slave controller managing one slave storage unit including data to transmit to the remote storage.

5. The method of claim 1, wherein each slave controller maintains a first data structure indicating updated data in the slave storage unit, wherein the slave controller transmits data in the slave storage unit indicated in the first data structure to the remote storage, further comprising:
    transmitting a command to each slave controller to cause the slave controller to generate a second data structure to indicate any writes received to the slave storage unit during the transmittal of data in the slave storage unit indicated in the first data structure to the remote storage.

6. The method of claim 1, further comprising:
    transmitting a command to each slave controller to cause each slave controller to initiate an operation to cause the data from the slave storage unit at the remote storage to be copied to a remote backup storage after determining that all the slave controllers have successfully transmitted the data in the slave storage units to the remote storage.

7. The method of claim 6, further comprising:
    determining whether the data from the slave storage units at the remote storage were successfully copied to the backup remote storage; and
    transmitting a command to each slave controller whose slave storage unit data was successfully copied to the remote backup storage to reverse the copying of the slave storage unit data from the remote storage to the remote backup storage and return to a previous point-in-time copy in response to determining that the data from at least one of the slave storage units at the remote storage was not successfully copied to the remote backup storage.

8. The method of claim 1, wherein the remote storage comprises a plurality of remote storage systems, wherein each remote storage system is coupled to one or more remote storage controllers, wherein each slave controller transmits data to one or more remote storage controllers to store the slave storage unit data in the remote storage system coupled to the remote storage controller, and wherein each storage unit comprises a volume of data.

9. A method for forming a consistency group of data, comprising:
    providing information on a consistency group relationship indicating a plurality of slave controllers and, for each indicated slave controller, an indicated portion of a slave storage unit managed by the slave controller, wherein the slave controllers indicated in the consistency group transmit data from the indicated portions of their respective slave storage units consistent as of a point-in-time;
    transmitting a command to each slave controller in the consistency group relationship to cause each slave controller to transmit data in the portion of the slave storage unit to a remote storage in a manner that forms the consistency group;
    determining whether all the slave controllers successfully transmitted the data in the portions of the slave storage units that is part of the consistency group to the remote storage; and
    transmitting a command to each slave controller to cause each slave controller to initiate a virtual copy operation to cause the data from the slave storage unit at the remote storage to be copied to a remote backup storage after determining that all the slave controllers have successfully transmitted the data in the slave storage units to the remote storage.

10. A method for forming a consistency group, comprising:
    receiving a command from a master controller to generate a first data structure to indicate updates to a slave storage unit to form a consistency group initiated by the master controller, wherein data in the slave storage unit in the consistency group is transmitted consistent as of a point-in-time;
    generating the first data structure in response to the command;
    transmitting complete to the master controller after generating the first data structure;
    copying updated data in the slave storage unit indicated in a second data structure to a remote storage, wherein the data is copied to form the consistency group, wherein updates to the slave storage unit received while copying the updated data indicated in the second data structure to form the consistency group are indicated in the first data structure;
    transmitting complete to the master controller after successfully copying the data in the slave storage unit indicated in the second data structure to the remote storage;
    indicating in the second data structure that data in the slave storage unit is not updated in response to transmitting the corresponding data to the remote storage;
    indicating in the second data structure updated data in the slave storage unit that is indicated as updated in the first data structure in response to the second data structure not indicating any updated data to copy to the remote storage; and
    indicating updates to data in the slave storage unit in the second data structure that are received after completing the copying of the data to the remote storage.

11. The method of claim 10, further comprising:
    queuing updates to the slave storage unit received while generating the first data structure;
    applying the updates to the slave storage unit after generating the first data structure; and
    indicating the queued updates applied to the slave storage unit in the first data structure.

12. A system in communication with a plurality of slave controllers, wherein each slave controller manages at least one slave storage unit, and wherein each slave controller is in communication with one remote storage, comprising:
    a processor;
    a computer readable storage medium including storage management software executed by the processor to perform operations, the operations comprising:
        providing information on a consistency group relationship indicating a plurality of the slave controllers and, for each indicated slave controller, an indicated portion of a at least one slave storage unit managed by the slave controller, wherein the slave controllers indicated in the consistency group transmit data from the indicated portions of their respective slave storage units consistent as of a point-in-time;

transmitting a command to each slave controller in the consistency group relationship to cause each slave controller to transmit data in the portion of the slave storage unit to one remote storage in a manner that forms the consistency group;

determining whether all the slave controllers successfully transmitted the data in the portions of the slave storage units that is part of the consistency group to the remote storage; and copying data from a plurality of local controllers at a local site to the slave controllers at an intermediate site to store in the slave storage units, wherein the local controllers and slave controllers are at different geographical sites and the remote storage is at a remote geographical location with respect to the geographical sites including the local and slave controllers.

13. The system of claim 12, wherein the operations of providing information on the consistency group relationship, transmitting the commands to each slave controller, and determining whether all the slave controller successfully transmitted the data in the slave storage units to form the consistency group are performed by a master controller in data communication with the slave controllers.

14. The system of claim 13, wherein the master controller also comprises one slave controller managing one slave storage unit including data to transmit to the remote storage.

15. The system of claim 12, wherein each slave controller maintains a first data structure indicating updated data in the slave storage unit, wherein the slave controller transmits data in the slave storage unit indicated in the first data structure to the remote storage, wherein the operations further comprise:
transmitting a command to each slave controller to cause the slave controller to generate a second data structure to indicate any writes received to the slave storage unit during the transmittal of data in the slave storage unit indicated in the first data structure to the remote storage.

16. The system of claim 12, wherein the operations further comprise:
transmitting a command to each slave controller to cause each slave controller to initiate an operation to cause the data from the slave storage unit at the remote storage to be copied to a remote backup storage after determining that all the slave controllers have successfully transmitted the data in the slave storage units to the remote storage.

17. The system of claim 16, wherein the operations further comprise:
determining whether the data from the slave storage units at the remote storage were successfully copied to the backup remote storage; and
transmitting a command to each slave controller whose slave storage unit data was successfully copied to the remote backup storage to reverse the copying of the slave storage unit data from the remote storage to the remote backup storage and return to a previous point-in-time copy in response to determining that the data from at least one of the slave storage units at the remote storage was not successfully copied to the remote backup storage.

18. The system of claim 12, wherein the remote storage comprises a plurality of remote storage systems, wherein each remote storage system is coupled to one or more remote storage controllers, wherein each slave controller transmits data to one or more remote storage controllers to store the slave storage unit data in the remote storage system coupled to the remote storage controller, and wherein each storage unit comprises a volume of data.

19. The system of claim 12, wherein the operations further comprise:
copying data from a plurality of local controllers to the slave controllers to store in the slave storage units, wherein the local controllers and slave controllers are at different geographical sites and the remote storage is at a remote geographical location with respect to the geographical sites including the local and slave controllers.

20. A system in communication with a plurality of slave controllers, wherein each slave controller manages at least one slave storage unit, and wherein each slave controller is in communication with one remote storage, comprising:
a processor;
a computer readable storage medium including storage management software executed by the processor to perform operations, the operations comprising:
providing information on a consistency group relationship indicating a plurality of the slave controllers and, for each indicated slave controller, an indicated portion of a at least one slave storage unit managed by the slave controller, wherein the slave controllers indicated in the consistency group transmit data from the indicated portions of their respective slave storage units consistent as of a point-in-time;
transmitting a command to each slave controller in the consistency group relationship to cause each slave controller to transmit data in the portion of the slave storage unit to one remote storage in a manner that forms the consistency group;
determining whether all the slave controllers successfully transmitted the data in the portions of the slave storage units that is part of the consistency group to the remote storage; and
transmitting a command to each slave controller to cause each slave controller to initiate a virtual copy operation to cause the data from the slave storage unit at the remote storage to be copied to a remote backup storage after determining that all the slave controllers have successfully transmitted the data in the slave storage units to the remote storage.

21. A system in communication with a master controller, comprising:
a slave storage unit;
a processor;
a computer readable storage medium including storage management software executed by the processor to function as a slave system with respect to the master controller and perform operations, the operations comprising:
receiving a command from the master controller to generate a first data structure to indicate updates to the slave storage unit to form a consistency group initiated by the master controller, wherein data in the slave storage unit in the consistency group is transmitted consistent as of a point-in-time;
generating the first data structure in response to the command;
transmitting complete to the master controller after generating the first data structure;

generating a second data structure indicating updated data in the slave storage unit;

copying updated data in the slave storage unit indicated in the second data structure to a remote storage, wherein the data is copied to form the consistency group, wherein updates to the slave storage unit received while copying the updated data indicated in the second data structure to form the consistency group are indicated in the first data structure;

transmitting complete to the master controller after successfully copying the data in the slave storage unit to the remote storage;

indicating in the second data structure that data in the slave storage unit is not updated in response to transmitting the corresponding data to the remote storage;

indicating in the second data structure updated data in the slave storage unit that is indicated as updated in the first data structure in response to the second data structure not indicating any updated data to copy to the remote storage; and indicating updates to data in the slave storage unit in the second data structure that are received after completing the copying of the data to the remote storage.

22. The system of claim 21, wherein the command received from the master controller comprises a first command, and wherein the system is in communication with a remote controller managing the remote storage, wherein the operations further comprise:

receiving a second command from the master controller to cause the copying of the slave storage unit data in the remote storage to a remote backup storage after transmitting the complete indicating that the slave storage unit data was successfully copied to the remote storage; and transmitting a third command to the remote controller managing the remote storage to cause the copying of the slave storage unit data in the remote storage to the remote backup storage in response to receiving the third command.

23. An article of manufacture comprising a computer readable storage medium including code executed to form a consistency group of data, wherein a plurality of slave controllers manage slave storage units and to perform operations, the operations comprising:

providing information on a consistency group relationship indicating a plurality of the slave controllers and, for each indicated slave controller, an indicated portion of a slave storage unit managed by the slave controller, wherein the slave controllers indicated in the consistency group transmit data from the indicated portions of their respective slave storage units consistent as of a point-in-time;

transmitting a command to each slave controller in the consistency group relationship to cause each slave controller to transmit data in the portion of the slave storage unit to a remote storage in a manner that forms the consistency group;

determining whether all the slave controllers successfully transmitted the data in the portions of the slave storage units that is part of the consistency group to the remote storage; and copying data from a plurality of local controllers at a local site to the slave controllers at an intermediate site to store in the slave storage units, wherein the local controllers and slave controllers are at different geographical sites and the remote storage is at a remote geographical location with respect to the geographical sites including the local and slave controllers.

24. The article of manufacture of claim 23, wherein the remote storage is located at a remote site and wherein each slave storage unit is stored within a storage system attached to one slave controller.

25. The article of manufacture of claim 23, wherein the operations of providing information on the consistency group relationship, transmitting the commands to each slave controller, and determining whether all the slave controller successfully transmitted the data in the slave storage units to form the consistency group are performed by a master controller in data communication with the slave controllers.

26. The article of manufacture of claim 25, wherein the master controller also comprises one slave controller managing one slave storage unit including data to transmit to the remote storage.

27. The article of manufacture of claim 23, wherein each slave controller maintains a first data structure indicating updated data in the slave storage unit, wherein the slave controller transmits data in the slave storage unit indicated in the first data structure to the remote storage, wherein the operations further comprise:

transmitting a command to each slave controller to cause the slave controller to generate a second data structure to indicate any writes received to the slave storage unit during the transmittal of data in the slave storage unit indicated in the first data structure to the remote storage.

28. The article of manufacture of claim 23, wherein the operations further comprise:

transmitting a command to each slave controller to cause each slave controller to initiate an operation to cause the data from the slave storage unit at the remote storage to be copied to a remote backup storage after determining that all the slave controllers have successfully transmitted the data in the slave storage units to the remote storage.

29. The article of manufacture of claim 28, wherein the operations further comprise:

determining whether the data from the slave storage units at the remote storage were successfully copied to the backup remote storage; and transmitting a command to each slave controller whose slave storage unit data was successfully copied to the remote backup storage to reverse the copying of the slave storage unit data from the remote storage to the remote backup storage and return to a previous point-in-time copy in response to determining that the data from at least one of the slave storage units at the remote storage was not successfully copied to the remote backup storage.

30. The article of manufacture of claim 23, wherein the remote storage comprises a plurality of remote storage systems, wherein each remote storage system is coupled to one or more remote storage controllers, wherein each slave controller transmits data to one or more remote storage controllers to store the slave storage unit data in the remote storage system coupled to the remote storage controller, and wherein each storage unit comprises a volume of data.

31. The article of manufacture of claim 23, wherein the operations further comprise:

copying data from a plurality of local controllers to the slave controllers to store in the slave storage units, wherein the local controllers and slave controllers are at different geographical sites and the remote storage is at a remote geographical location with respect to the geographical sites including the local and slave controllers.

32. An article of manufacture comprising a computer readable storage medium including code executed to form a consistency group of data, wherein a plurality of slave controllers manage slave storage units and to perform operations, the operations comprising:

providing information on a consistency group relationship indicating a plurality of the slave controllers and, for each indicated slave controller, an indicated portion of a slave storage unit managed by the slave controller, wherein the slave controllers indicated in the consistency group transmit data from the indicated portions of their respective slave storage units consistent as of a point-in-time;

transmitting a command to each slave controller in the consistency group relationship to cause each slave controller to transmit data in the portion of the slave storage unit to a remote storage in a manner that forms the consistency group;

determining whether all the slave controllers successfully transmitted the data in the portions of the slave storage units that is part of the consistency group to the remote storage; and transmitting a command to each slave controller to cause each slave controller to initiate a virtual copy operation to cause the data from the slave storage unit at the remote storage to be copied to a remote backup storage after determining that all the slave controllers have successfully transmitted the data in the slave storage units to the remote storage.

33. An article of manufacture comprising a computer readable storage medium including code executed to form a consistency group of data and to perform operations, the operations comprising receiving a command from a master controller to generate a first data structure to indicate updates to a slave storage unit to form a consistency group initiated by the master controller, wherein data in the slave storage unit in the consistency group is transmitted consistent as of a point-in-time;

generating the first data structure in response to the command;

transmitting complete to the master controller after generating the first data structure;

copying updated data in the slave storage unit indicated in a second data structure to a remote storage, wherein the data is copied to form the consistency group, wherein updates to the slave storage unit received while copying the updated data indicated in the second data structure to form the consistency group are indicated in the first data structure;

transmitting complete to the master controller after successfully copying the data in the slave storage unit indicated in the second data structure to the remote storage;

indicating in the second data structure that data in the slave storage unit is not updated in response to transmitting the corresponding data to the remote storage;

indicating in the second data structure updated data in the slave storage unit that is indicated as updated in the first data structure in response to the second data structure not indicating any updated data to copy to the remote storage; and indicating updates to data in the slave storage unit in the second data structure that are received after completing the copying of the data to the remote storage.

34. The article of manufacture of claim 33, wherein the command received from the master controller comprises a first command, wherein the operations further comprise:

receiving a second command from the master controller to cause the copying of the slave storage unit data in the remote storage to a remote backup storage after transmitting the complete indicating that the slave storage unit data was successfully copied to the remote storage; and transmitting a third command to a remote controller managing the remote storage to cause the copying of the slave storage unit data in the remote storage to the remote backup storage in response to receiving the third command.

35. The article of manufacture of claim 33, wherein the operations further comprise:

queuing updates to the slave storage unit received while generating the first data structure;

applying the updates to the slave storage unit after generating the first data structure; and indicating the queued updates applied to the slave storage unit in the first data structure.

36. The article of manufacture of claim 34, wherein the operations further comprise:

queuing updates to the slave storage unit received while generating the first data structure;

applying the updates to the slave storage unit after generating the first data structure; and indicating the queued updates applied to the slave storage unit in the first data structure.

* * * * *